United States Patent [19]
Chiang et al.

[11] Patent Number: 5,162,495
[45] Date of Patent: Nov. 10, 1992

[54] SYNTHESIS OF QUINOLINE AND SUBSTITUTED QUINOLINE COPOLYMERS

[75] Inventors: Long Y. Chiang, Somerset, N.J.; John W. Swirczewski, Kintnersville, Pa.

[73] Assignee: Exxon Research and Engineering Company, Florham Park, N.J.

[21] Appl. No.: 435,146

[22] Filed: Nov. 13, 1989

[51] Int. Cl.$^5$ .............................................. C08G 73/06
[52] U.S. Cl. .................................... 528/423; 528/422
[58] Field of Search ................................ 528/423, 422

[56] References Cited
U.S. PATENT DOCUMENTS
4,727,135  2/1988  Chiang et al. ..................... 528/423

Primary Examiner—Harold D. Anderson
Attorney, Agent, or Firm—Joseph J. Dvorak; Linda M. Scuorzo

[57] ABSTRACT

The present invention is predicated on the discovery that quinoline and substituted quinoline derivatives, having substituents in positions other than the 2 and 6 position, undergo polymerization in the presence of tetrahydroquinoline or substituted tetrahydroquinolines and a transition metal sulfide catalyst to produce polymers that have repeating quinoline and substituted moieties.

Thus, in one embodiment of the present invention, there is provided a novel method of preparing polymers having the formula

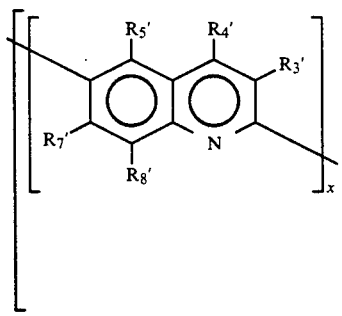
(7)

-continued

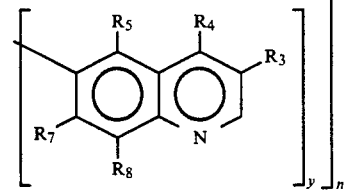

which comprises contacting a tetrahydroquinoline having the formula

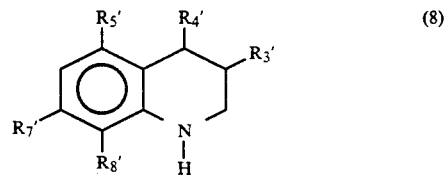
(8)

with a quinoline compound having the formula

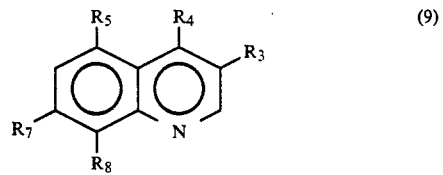
(9)

at elevated temperatures and in the presence of a transition metal sulfide catalyst wherein the metal is selected from Groups VIB, VIIB of the periodic table and mixtures thereof and wherein the Rs (i.e. $R_3$, $R_4$, etc.) and the R's (i.e. $R'_3$, $R'_4$, etc.) may be the same or different and are selected from hydrogen, halogen (especially fluoro-, chloro- and bromo-), —$NO_2$, OH, —$NH_2$, —SH, —CN and organic substituents. In the above polymer, x and y represent the relative proportion of bracketed structural quinoline or substituted moieties, and n is an integer equal to or greater than 2.

16 Claims, No Drawings

SYNTHESIS OF QUINOLINE AND SUBSTITUTED QUINOLINE COPOLYMERS

FIELD OF THE INVENTION

The present invention relates to novel polyquinoline type copolymers and to the preparation of both homo- and copolymers having repeating quinoline and substituted quinoline moieties.

BACKGROUND OF THE INVENTION

The catalytic dehydrogenative polymerization of tetrahydroquinoline and certain organo substituted tetrahydroquinoline compounds is disclosed in U.S. Pat. 4,727,135. The polymers produced in the disclosed process contain repeating quinoline moieties. For example, the transition metal sulfide (TMS) catalyzed dehydrogenative polymerization of 1,2,3,4-tetrahydroquinoline (1) produces polyquinoline (2) as shown in Equation 1 below.

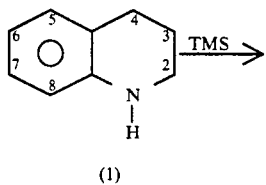

(Eq. 1)

(1)

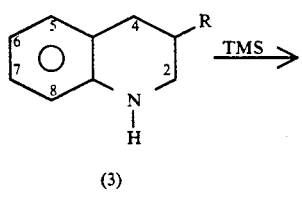

(2)

Similarly, the dehydrogenative polymerization of 3-mono organo substituted tetrahydroquinoline (3) produces a substituted polyquinoline polymer having a 3-organo substituted quinoline moiety (4). This is shown in Equation 2 below, where R represents the organo substituent.

(Eq.2)

(3)

(4)

These polymers constitute an important class of electrically conducting organic materials that have use in batteries, photoconductive cells and the like.

In copending application Ser. No. 155,225, filed Feb. 12, 1988, quaternary ammonium salts of polyquinoline oligomers are disclosed and shown to have use as metal corrosion inhibitors.

In contrast to the above mentioned references, U.S. Pat. No. 4,275,191 discloses that quinoline will not undergo polymerization, except at elevated pressures and temperatures of between 250° C. and 400° C. and in the presence of catalytic amounts of certain alkyl halides. The product of the polymerization, however, does not have repeating quinoline moieties but, instead, is represented by formulas 5 and 6 shown below.

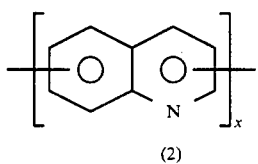

(5)

(6)

SUMMARY OF THE INVENTION

The present invention is predicated on the discovery that quinoline and substituted quinoline derivatives, having substituents in positions other than the 2 and 6 position, undergo polymerization in the presence of tetrahydroquinoline or substituted tetrahydroquinolines and a transition metal sulfide catalyst to produce polymers that have repeating quinoline and substituted moieties.

Thus, in one embodiment of the present invention, there is provided a novel method of preparing polymers having the formula

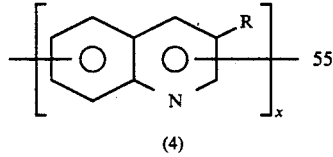

(7)

which comprises contacting a tetrahydroquinoline having the formula

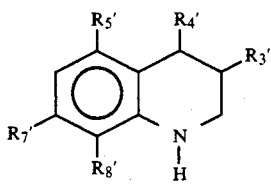

(8)

the weight ratio of tetrahydroquinoline to 8-substituted quinoline will be in the range of from about 1:100 to 4:1, but preferably will be in the range of about 1:10 to 1:1.

In another embodiment of the present invention, there is provided a novel copolymer having the formula

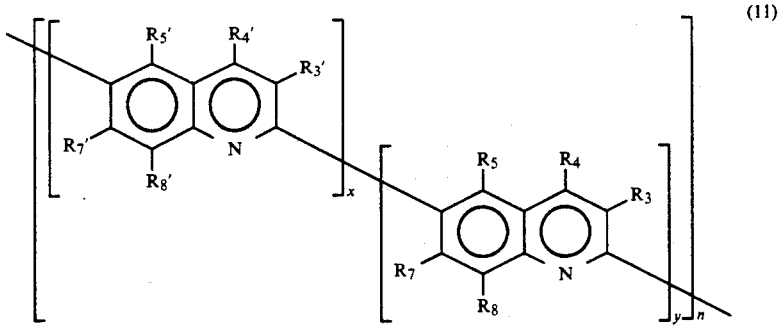

(11)

with a quinoline compound having the formula

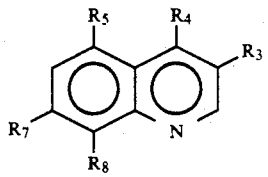

(9)

at elevated temperatures and in the presence of a transition metal sulfide catalyst wherein the metal is selected from Groups VIB, VIIB and VIIIB of the periodic table and mixtures thereof and wherein the Rs (i.e. $R_3$, $R_4$, etc.) and the R's (i.e. $R'_3$, $R'_4$, etc.) may be the same or different and are selected from hydrogen, halogen (especially fluoro-, chloro- and bromo-), $-NO_2$, OH, $-NH_2$, $-SH$, $-CN$ and organic substituents. In the above polymer, x and y represent the relative proportion of bracketed structural quinoline or substituted moieties, and n is an integer equal to or greater than 2.

In a particularly preferred embodiment of the present invention, there is provided a method of preparing a polymer having the formula

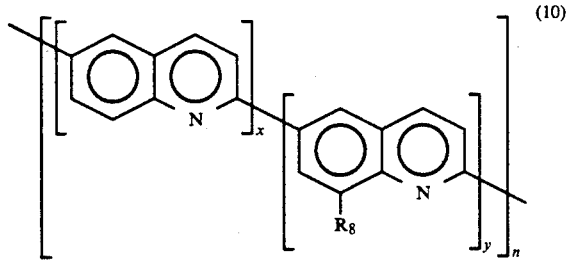

(10)

in which x and y designate the relative proportions of the bracketed moieties, n is an integer and $R_8$ signifies a substituent at the 8-position of quinoline, the method comprising heating 1,2,3,4-tetrahydroquinoline and an 8-substituted quinoline compound in the presence of a rhenium sulfide catalyst at a temperature and for a time sufficient to form the copolymer. In the above method, the tetrahydroquinoline is present in an amount sufficient to cause the polymerization to occur. In general, in which the Rs are selected from hydrogen, halogen (especially fluoro-, chloro- and bromo-), $-NO_2$, OH, $-NH_2$, $-SH$, $-CN$ and organic substituents and the R's are selected from hydrogen and organic substituents, with at least one of the Rs being different from the corresponding R' and in which x and y represent the relative proportions of the respective moieties and n is an integer $>2$.

These and other embodiments of the present invention become readily apparent upon a reading of the "Detailed Description", which follows.

DETAILED DESCRIPTION OF THE INVENTION

Quinoline and substituted quinoline compounds do not undergo polymerization in the presence of transition metal sulfide, catalysts, such as rhenium sulfide. In contrast, tetrahydroquinoline and certain organo substituted tetrahydroquinoline compounds have been shown to undergo catalytic dehydrogenative polymerization in the presence of transition metal sulfide catalysts, such as rhenium sulfide. (See U.S. Pat. No. 4,727,135.)

Surprisingly, it now has been discovered that quinoline and substituted quinoline compounds, having substituents in other than the 2 and 6 position, can be polymerized if the polymerization is conducted in the presence of a transition metal sulfide catalyst and tetrahydroquinoline or an organo substituted tetrahydroquinoline compound.

In practice of the present invention, the tetrahydroquinoline compounds employed in the polymerization have the formula

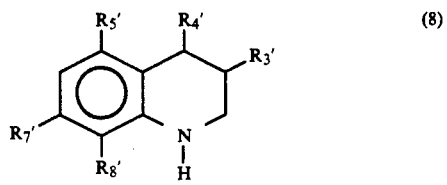

(8)

wherein the subscript 3, 4, 5, 7 and 8 represent ring positions for the R' substituents and the R's are the same or different and are selected from $-H$ and organic substituents.

The quinoline substituent may be selected from the group consisting of alkyl, aralkyl, aryl, alkaryl, alkenyl, alkoxy, alkanoxylamino and alkyl carboxylates. Typically the organic group will have no more than about 30 carbon atoms. For example, when the organo substituent is alkyl and alkoxy, it generally will have from 1 to 30 carbon atoms and preferably from 1 to 20 carbon atoms. When the organo substituent is alkenyl, alkyl carboxylates and alkanoxylamine group it will generally have from 2 to 30 carbon atoms and preferably from 2 to 20 carbon atoms. Aryl and aralkyl groups will have from 1 to 3 rings and preferably 1 ring with the alkyl portion of the aralkyl group having from 1 to about 20 carbon atoms. Particularly preferred organic substituents include alkyl groups having 1 to 5 carbon atoms, alkoxy groups having 1 to 4 carbon atoms, alkoxylamino, and alkyl carboxy groups having from 2 to 5 carbon atoms.

As between tetrahydroquinoline and organo-substituted hydroquinolines, the tetrahydroquinoline is generally the preferred material.

The quinoline compounds employed in the practice of the present invention are selected from quinoline compounds having the following formula

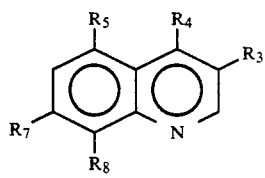

(9)

wherein the numbers 3, 4, 5, 7 and 8 indicate ring positions for the R substituents and the Rs are the same or different and are selected from hydrogen, halogen (especially fluoro-, chloro- and bromo-), $-NO_2$, OH, $-NH_2$, $-SH$, $-CN$ and organic substituents. In addition to hydrogen, $-NH_2$, OH and organo-substituents are preferred R substituents. When the R substituents are organo, they may be selected from the same groups as the R' organo groups previously enumerated.

The catalysts employed in the process of the present invention are selected from transition metal sulfide catalysts in which the transition metal is selected from the group consisting of transition metals of Groups VIB, VIIB and VIIIB of the periodic table (see *The Merck Index*, 10th Edition, Merck & Company, Inc., Rahway, N.J.) and mixtures thereof. Rhenium sulfide and ruthenium sulfide are particularly preferred catalysts. Indeed, suitable rhenium sulfide catalysts may be prepared as described in U.S. Pat. No. 4,308,171, which is incorporated herein by reference.

The weight ratio of tetrahydroquinoline compound to quinoline compound employed in the process of the present invention may vary over a wide range. In general, the ratio will be sufficient to bring about polymerization of the tetrahydroquinoline and quinoline compounds. In general, however, the weight ratio will be in the range of about 1:100 to 4:1 and preferably in the range of 1:10 to 1:1.

In general, the polymerization will occur at temperatures above about 25° C. and generally at elevated temperatures, for example, in the range of about 180° C. to about 270° C.

The polymerization is conducted by contacting the tetrahydroquinoline compound, the quinoline compound and the transition metal sulfide catalyst at elevated temperatures for a time sufficient to result in the formation of the polymer. At temperatures of about 180° C. to 270° C., for example, contact times are of the order of about 12 hours to about 7 days.

In a preferred embodiment of the present invention, 1,2,3,4-tetrahydroquinoline and a quinoline compound having the formula

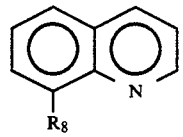

wherein $R_8$ is selected from hydrogen, halogen (especially fluoro-, chloro- and bromo-), $-OH$, $-NH_2$, $-NO_2$, $-SH$, $-CN$ and organo substituents are contacted at elevated temperatures in the presence of a transition metal sulfide catalyst for a time sufficient for polymerization to occur.

It will be appreciated that, in this preferred embodiment, when R substituent is hydrogen, the product is polyquinoline and when $R_8$ is other than hydrogen, then the product is a copolymer having quinoline and 8 substituted quinoline moieties.

It will also be appreciated that when $R_8$ is an organo substituent, it will be selected from one of the organo substituents previously enumerated for any organo R substituent.

The polyquinoline compounds made by the process of the present invention are converted to quaternary ammonium compounds by interaction with alkylating agents, especially p-alkylbenzyl halides, dehaloxylines, dialkyl sulfates, dialkoxy carbonium salts and trialkyl oxonium salts like:

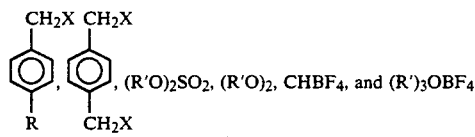

wherein X is Cl, Br or I and R is hydrogen or an alkyl group having from 1 to about 20 carbon atoms and R' is an alkyl group having from about 1 to 20 carbon atoms.

EXAMPLES

In the examples which follow, 1,2,3,4-tetrahydroquinoline and quinoline were commercially available compounds that were dried over an activated molecular sieve and stored under nitrogen before use. The substituted quinoline derivatives, lithium sulfide, rhenium pentachloride, ammonium hexachlororuthenate, molybdenum pentachloride and rhodium trichloride employed in the examples were all commercially acquired materials that we used as supplied. Other reactants were prepared according to the general synthetic procedures outlined below.

A. General Procedure for Synthesis of 8-Alkoxy Quinoline

To a 500 ml, two-necked flask charged with 8-hydroxy quinoline (14.4 grams, 0.1 mole), tricaprylylmethyl ammonium chlorite (aliquat 336) (500 mg), distilled water (100 ml) and sodium hydroxide (10 g) is added and stirred at room temperature for about 2 hours. To the resulting solution is added an alkyl halide (0.11 moles) with vigorous stirring. The suspension is heated at the boiling point of the alkyl halide for 10 hours. It is then dried by the evaporation of solvent to give an oil. Hexane (300 ml) extraction of the oil followed by chromatography (silica gel) using hexane as an eluent gives the 8-alkoxy quinoline compound in 80 to 95% yield. For example, using this method, 8-butoxyquinoline was prepared in 80 to 95% yield.

B. General Procedure for Synthesis of 8-Alkanoylaminoquinoline

A 500 ml, two-necked flask charged with 8-aminoquinoline (14.4 g, 0.1 mole), distilled water (100 ml) and sodium hydroxide (10 g) is stirred at room temperature for about 2 hours. To the resulting mixture is added an alkanoyl chloride (0.11 moles) with vigorous stirring. The suspension is heated at the boiling point of the alkanoyl chloride for 5 hours. It is then extracted with diethyl ether (3 times, 100 ml each). The combined diethyl ether solution is dried over magnesium sulfate, filtered and the solvent is evaporated to give 8-alkanoylaminoquinoline in about 70 to 80% yield. For example, 8-acetaminoquinoline was prepared by this general method.

C. General Procedures for Synthesis of Substituted Tetrahydroquinoline via Catalytic Hydrogenation A stirred suspension of a substituted quinoline (0.1 mole) and 5% palladium on carbon (3 g) in methanol (250 ml) is hydrogenated at 50 psi at room temperature to a maximum of 80° C. After no starting material is detected by $^1$H NMR in a sample, the catalyst is filtered and washed with methanol (100 ml). The solvent is evaporated to dryness to give the corresponding tetrahydroquinoline at 90 to 100% yield. For example, using this method, 8-methylquinoline was converted to 8 TM methyl-1,2,3,4-tetrahydroquinoline and 8-ethylquinoline was converted to 8-ethyl-1,2,3,4-tetrahydroquinoline.

D. General Procedure for Synthesis of Transition Metal Sulfide Catalysts

Method A

A three-neck flask (1 L) connected with a condenser and a hydrogen sulfide inlet tube is charged with 1,2,3,4-tetrahydroquinoline (400 g) and is maintained under an inert atmosphere. To it is slowly added, while stirring, either one of the following transition metal chlorides (48 millimoles): rhenium pentachloride, $ReCl_5$, ammonium hexachlororuthenate, $(NH_4)_2RuCl_6$, molybdenum pentachloride, $MoCl_5$ or rhodium trichloride, $RhCl_3$, over a period of 4 hours to prevent a sharp rise in temperature above 80° C. due to the exothermic reaction. After stirring the mixture for an additional 8 hours, it is purged below the liquid surface with hydrogen sulfide for 4 hours at a rate of 20 millimeters per minute. It is then stirred for 8 to 12 hours at ambient temperatures. The resulting suspension can be use directly for the polymerization reaction as described subsequently. $ReS_x$ was prepared in this manner.

Method B

The suspension from Method A, above, is added to hexane (1 L) to complete the precipitation of a dark brown solid, the solid is filtered under vacuum and washed with hexane (200 ml), water (500 ml), and acetone (400 ml). It is then dried in vacuo at 50° C. to yield a black transition metal sulfide solid. $ReS_x$ was prepared by this method as well as Method A.

Method C

A 2-liter, single neck flask with a large magnetic stirring bar was charged with absolute ethanol (1 L) and maintained at 55° C. Lithium sulfide (12.6 g, 0.35 moles) was added with stirring slowly over a period of one-half hour. The resulting suspension was allowed to cool to room temperature. Ammonium hexachlororuthenate (35 g) was added over a period of 1.5 hours and the stirring continued for 48 hours. The resulting black suspension was separated by suction filtration through a medium frit glass funnel. The solids collected were washed with warm ethanol 3 times (200 ml each) and dried at 50° C. in a vacuum oven to give black ruthenium sulfide in substantially quantitative yield.

EXAMPLES 1 TO 18

In each example, a single-neck, round bottom flask was equipped with a condenser and an inert gas bubbler. It was then charged with the tetrahydroquinoline compound and the quinoline compound listed in Table I, which follows. The flask was also charged with from 1.8% to 3 wt.% by weight of a metal sulfide catalyst. The specific catalyst employed in each example and its method of preparation is shown in Table I. The suspended mixture was maintained under an inert atmosphere (argon) and heated at 270° C. for from 15 to about 21 hours. At this temperature, a gentle reflux of the tetrahydroquinoline compound occurred. At the end of tee heating period, the reaction mixture was cooled to room temperature to give a dark solid. The solid was transferred into a chloroform solution (15-25 ml per gram of product), forming a suspension which was stirred overnight at 60° C. The insoluble solid was then filtered and washed with another portion of chloroform (400 ml). The combined chloroform solution was evaporated to give a dark reddish-brown paste. This paste was suspended and stirred in diethyl ether 20-25 ml per gram of sample) for 8 hours. The insolubles were filtered and washed with diethyl ether (200 ml) to yield a brown to reddish-brown solid polymer fraction (hereinafter designated PFC), which is chloroform soluble and diethyl ether insoluble. The solvent of the combined diethyl ether filtrates was evaporated to give a reddish sludge. This sludge was then suspended and stirred in hexane (20 ml per gram of sample) for 8 hours. The insoluble solid was filtered and washed with hexane (200 ml) to yield a polyquinoline polymer fraction (hereinafter designated as PFB), which is diethyl ether soluble and hexane insoluble. The remaining hexane solubles were dried to give a third product fraction (hereinafter identified as PFA).

The chloroform insolubles from the first solvent extraction were subsequently treated with concentrated HCl (10 ml per gram of sample) and stirred at 50° C. for 12 hours. The resulting acid solution was filtered through a sintered glass frit and celite under vacuum. The collected acid solution was neutralized with NaOH to effect precipitation of a brown solid which was then washed with distilled water and dried at 50° C. under vacuum to give a fourth polymer fraction (hereinafter PFD).

The structural characterization of fractions PFA, PFB, PFC and PFD were carried out using various spectroscopic methods. In Examples 1 to 6, elemental analyses of products in all of these fractions were consistent with a molecular formulation of $C_9H_{5+x}N$ close to the expected polyquinoline composition. The value of x appears to vary as a function of both the degree of aromatization and polymerization with a hydrogen atom as an end group. The characterization of product was performed mainly based on the PFC fractions isolated from the bulk product. The mass spectrum of the tetrameric quinoline isolated from the PFC fraction shows a clear consecutive weight loss of 127 which matches the m/z value of the quinoline unit in the oligomer. It also shows ion fragmentations of 128, 255, 383, 510, etc., corresponding to the monomeric, dimeric, trimeric, and tetrameric quinoline fragments. Infrared spectrum of quinoline oligomer, compared with that of 1,2,3,4-tetrahydroquinoline itself, showed a new band at 821 cm$^{-1}$ corresponding to the C—H out-of-plane deformation of heterocyclic ring moiety of quinoline in addition to a band at 746 cm$^{-1}$ of the C—H out-of-plane deformation of benzene ring moiety. This, along with the disappearance of a N—H band and a band at 2800-2930 cm$^{-1}$ in the IR spectrum of oligomer, which corresponds to the aliphatic C—H stretch in THQ, indicated that the heterocyclic ring moiety of oligomer has been fully dehydrogenated. The high aromaticity of the oligomer was further confirmed by the NMR spectroscopy. Both $^1$H NMR and $^{13}$C NMR of the oligomer fraction PFC contained either no, or only a trace of, aliphatic hydrogen and aliphatic carbon signals.

The GPC analysis of this fraction showed the relative intensity of oligomers of n=2 (25% of the total intensity), 3 (37% of the total intensity), 4-6 and higher (38% of the total intensity). The PFD fraction of Examples 1-6 contains polymers with an estimated repeating quinoline unit of n=7-13.

The characterization of products from Examples 7 to 18 were also performed by the study of various spectroscopic data similar to the analytical process described above. All the data is consistent with a copolymer structure having a linear polyquinoline moiety as a backbone of the polymer as set forth herein.

Further details are given in Table I below.

EXAMPLE 19

In this example, 50 moles of the quinoline oligomer of fraction PFC prepared in Examples 1 and 7, dimethylsulfate (7.6 g, 60 mmoles) and plimethylformamide (100 ml) was charged in a one neck round bottom flask fitted with a condensor. The mixture was heated at 90° to 100° C. for about 10 hours. After cooling to room temperature, the mixture was added to an ether solution. The precipitate was filtered, washed with ether and dried in vacuum to give the corresponding methyl quinolinium methyl sulfate oligomer in 75% yield.

EXAMPLE 20

In this example, the corrosion inhibiting properties of the quaternary ammonium salt prepared in Example 16 was tested by immersing for 24 hours a weighed sample of 304 stainless steel in concentrated HCl containing 0.3 wt % of the quaternary ammonium salt. The sample was removed, washed with H$_2$O, dried and reweighed to determine the weight loss. For comparative purposes, another weighed sample of steel was immersed in concentrated HCl for 24 hours and the weight loss measured. The sample that was immersed in the acid containing the quaternary ammonium salt lost 92% less weight.

What is claimed is:

1. A method for preparing a polymer having the formula

TABLE I

| Example | Monomer A | Monomer B | A/B Ratio | Sulfide Catalyst | % Yield of PFA | % Yield of PFB | % Yield of PFC | % Yield of PFD | % Yield Total |
|---|---|---|---|---|---|---|---|---|---|
| 1 | Q[1] | THQ[2] | 1 | Ru (Method C) | 9 | 12.0 | 22.1 | 54.0 | 97 |
| 2 | Q | THQ | 4 | Ru (Method C) | 13.7 | 12.1 | 29.4 | 45.4 | 100 |
| 3 | Q | THQ | 8 | Ru (Method C) | 13.7 | 17.4 | 18.7 | 50.1 | 100 |
| 4 | Q | THQ | 16 | Ru (Method C) | 10.7 | 20.7 | 24.1 | 44.5 | 100 |
| 5 | Q | THQ | 32 | Ru (Method C) | 84.1 | 1.0 | 5.7 | 1.4 | 92.1 |
| 6 | Q | THQ | 64 | Ru (Method C) | 57.0 | — | 4.6 | 2.1 | 63.7 |
| 7 | 8-CH$_3$-Q[3] | THQ | 1 | Ru (Method C) | 21.2 | 15.0 | 42.0 | 16.8 | 95.0 |
| 8 | 8-CH$_3$-Q | THQ | 2.5 | Ru (Method C) | 53.6 | 18.6 | 18.6 | 4.4 | 95.2 |
| 9 | 8-CH$_3$-Q | THQ | 5 | Ru (Method C) | 90.0 | 5.5 | — | 4.1 | 99.6 |
| 10 | 8-CH$_3$-Q | 8-CH$_3$-THQ[4] | 1 | Ru (Method A)[5] | 12.6 | 19.0 | 44.5 | 23.4 | 99.5 |
| 11 | 8-CH$_3$-THQ | 8-CH$_3$-THQ | 1 | Ru (Method C) | 38.3 | 21.1 | 13.6 | 9.1 | 82.1 |
| 12 | 8-ethyl-Q[6] | THQ | 1 | Ru (Method C) | 64.4 | 11.7 | 11.4 | 5.0 | 92.5 |
| 13 | 8-NH$_2$Q[7] | THQ | 1 | Ru (Method C) | 19.9 | 14.6 | 25.7 | 29.4 | 89.6 |
| 14 | 8-OH-Q[8] | THQ | 1 | Ru (Method C) | — | — | 3.0 | 93.5 | 96.5 |
| 15 | 8-butoxy-Q[9] | THQ | 1 | Ru (Method C) | 49.0 | 21.6 | 26.5 | 2.3 | 99.4 |
| 16 | 8-acetamino-Q[10] | THQ | 1 | Ru (Method C) | 13.3 | 23.6 | 30.0 | 33.1 | 100 |
| 17 | 4-methylcarboxy-Q[11] | THQ | 1 | Ru (Method C) | 18.8 | 49.2 | 26.2 | 5.8 | 100 |
| 18 | 4-methyl-Q[12] | THQ | 1 | Ru (Method C) | 29.6 | 23.5 | 35.3 | 11.6 | 83.0 |

[1]Q = Quinoline
[2]THQ = 1,2,3,4-tetrahydroquinoline
[3]8-CH$_3$-Q = 8-methylquinoline
[4]8-CH$_3$-THQ = 8-methyl-1,2,3,4-tetrahydroquinoline
[5]Similar results were obtained using ReS prepared by Method B
[6]8-ethyl-Q = 8-ethylquinoline
[7]8-NH$_2$-Q = 8-aminoquinoline
[8]8-OH-Q = 8-hydroxyquinoline
[9]8-butoxy-Q = 8-n-butoxyquinoline
[10]8-acetamino-Q = 8-acetaminoquinoline
[11]4-methylcarboxy-Q = 4-methylcarboxyquinoline
[12]4-methyl-Q = 4-methylquinoline

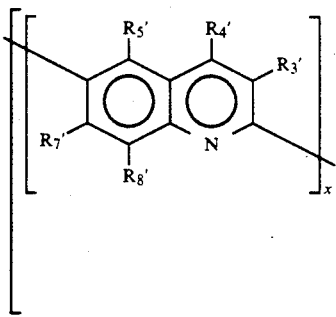

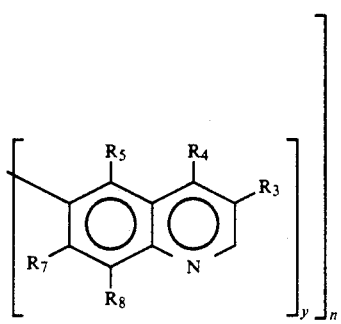

wherein x and y represent the relative proportion of the bracketed moieties and n is an integer equal to or greater than 2, which method comprises: contacting a tetrahydroquinoline compound having the formula

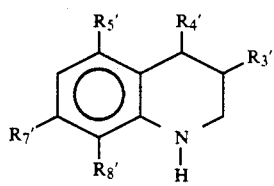

with a quinoline compound having the formula

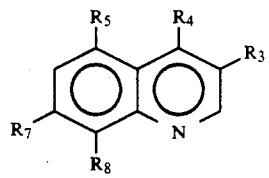

at elevated temperatures and in the presence of a transition metal sulfide catalyst wherein the metal is selected from the group consisting of Groups VIB, VIIB and VIIIB metals of the periodic table and mixtures thereof, the ratio of tetrahydroquinoline to quinoline compound being sufficient to form the polymer and wherein the R's and the Rs are the same or different and are selected from the group consisting of hydrogen, halogen, —NO$_2$, —OH, —NH$_2$, —SH, —CN and organic substituents.

2. The method of claim 1 wherein the organic substituent in both the tetrahydroquinoline and quinoline compounds is selected from the group consisting of alkyl, aralkyl, aryl, alkaryl, alkenyl, alkoxy, alkanoxylamino and alkyl carboxylates.

3. The method of claim 2 wherein the alkyl and alkoxy group has from about 1 to about 30 carbon atoms, the alkenyl, alkyl carboxylate and alkanolylamino group has from about 2 to about 30 carbon atoms, and the aryl and aralkyl group has from 1 to 3 rings.

4. The method of claim 3 wherein the weight ratio of tetrahydroquinoline to quinoline compound is in the range of from about 1:100 to about 4:1.

5. The method of claim 4 wherein the temperature is in the range of from about 180° C. to about 270° C.

6. The method of claim 5 wherein the ratio of tetrahydroquinoline compound to quinoline compound is about 1:10 to about 1:1.

7. The method of claim 4 wherein the tetrahydroquinoline compound is 1,2,3,4-tetrahydroquinoline.

8. The method of claim 7 wherein the quinoline compound is quinoline.

9. The method of claim 7 wherein the quinoline compound is an 8-substituted quinoline.

10. The method of claim 7 wherein the quinoline compound is a 4-substituted quinoline.

11. The method of claim 9 wherein the quinoline compound is an alkyl substituted quinoline in which the alkyl group has from 1 to about 5 carbon atoms.

12. The method of claim 9 wherein the quinoline compound is an alkoxy substituted quinoline in which the alkoxy group has from 1 to about 4 carbon atoms.

13. The method of claim 9 wherein the quinoline compound is an alkanoxyl substituted quinoline in which the alkanoxyl group has from 2 to about 5 carbon atoms.

14. The method of claim 9 wherein the quinoline compound is 8-amino quinoline.

15. The method of claim 9 wherein the quinoline compound is 8-hydroxy quinoline.

16. The method of claim 10 wherein the 4-substituted quinoline compound is a 4-alkylcarboxyquinoline compound having from 2 to about 5 carbon atoms in the alkyl carboxy group.

* * * * *